(12) United States Patent
Bivens

(10) Patent No.: US 6,820,540 B1
(45) Date of Patent: Nov. 23, 2004

(54) WALLED FRYER ELEMENT

(76) Inventor: Thomas H. Bivens, P.O. Box 1247, Magnolia, TX (US) 77353-1247

( * ) Notice: Subject to any disclaimer, the term of this patent is extended or adjusted under 35 U.S.C. 154(b) by 39 days.

(21) Appl. No.: 10/600,743

(22) Filed: Jun. 20, 2003

Related U.S. Application Data

(60) Provisional application No. 60/391,113, filed on Jun. 21, 2002.

(51) Int. Cl.[7] .......................... A47J 37/00; A47J 37/12; C11B 5/00
(52) U.S. Cl. ..................... 99/408; 99/446; 210/DIG. 8; 210/167
(58) Field of Search .......................... 99/408, 403, 446; 210/DIG. 8, 167, 461, 486, 489; 134/111, 169 R

(56) References Cited

U.S. PATENT DOCUMENTS

| | | | |
|---|---|---|---|
| 3,159,095 A | * | 12/1964 | Wagner ........................ 99/408 |
| 4,328,097 A | * | 5/1982 | Whaley et al. ............. 210/167 |
| RE34,636 E | | 6/1994 | Bivens |
| 5,404,799 A | | 4/1995 | Bivens |
| 5,486,370 A | | 1/1996 | Bivens |
| 5,870,945 A | * | 2/1999 | Bivens ........................ 99/408 |

* cited by examiner

Primary Examiner—Reginald L. Alexander
(74) Attorney, Agent, or Firm—Keeling Hudson LLC.

(57) ABSTRACT

A filter assembly for a fryer system includes wall elements around the perimeter of the filter, such wall elements allowing the accumulation of a quantity of particulates filtered from the cooking oil. Passageways provided at the base of the wall elements and drain openings between individual wall segments allow draining of cooking oil from the filter surface as the filter assembly is removed from the cooking oil.

20 Claims, 3 Drawing Sheets

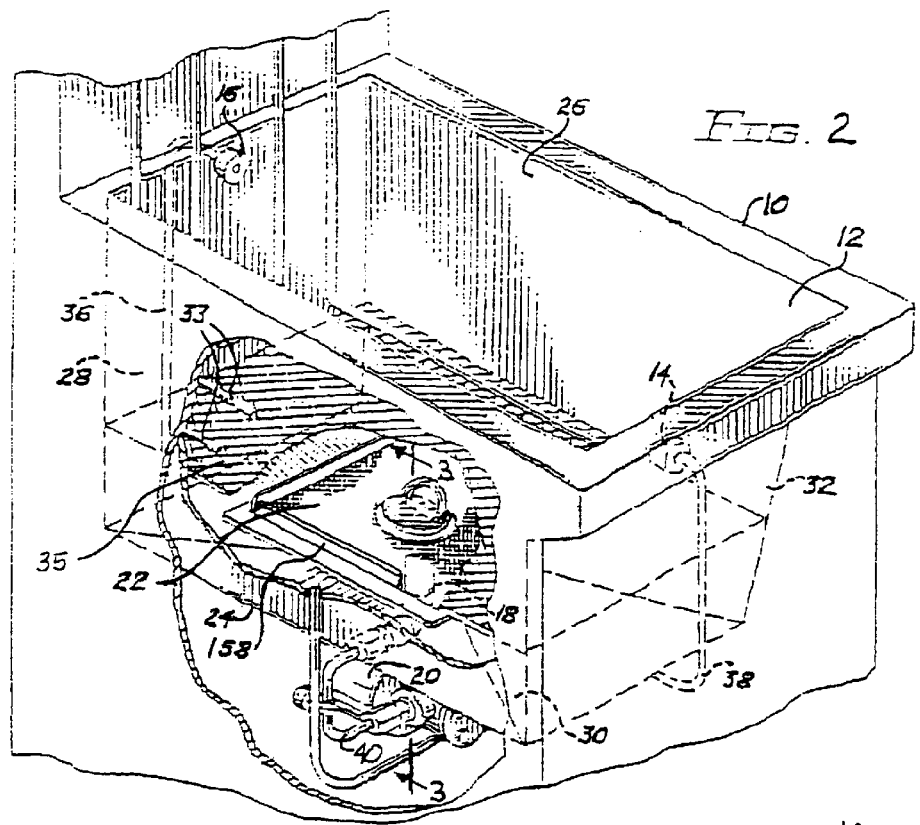
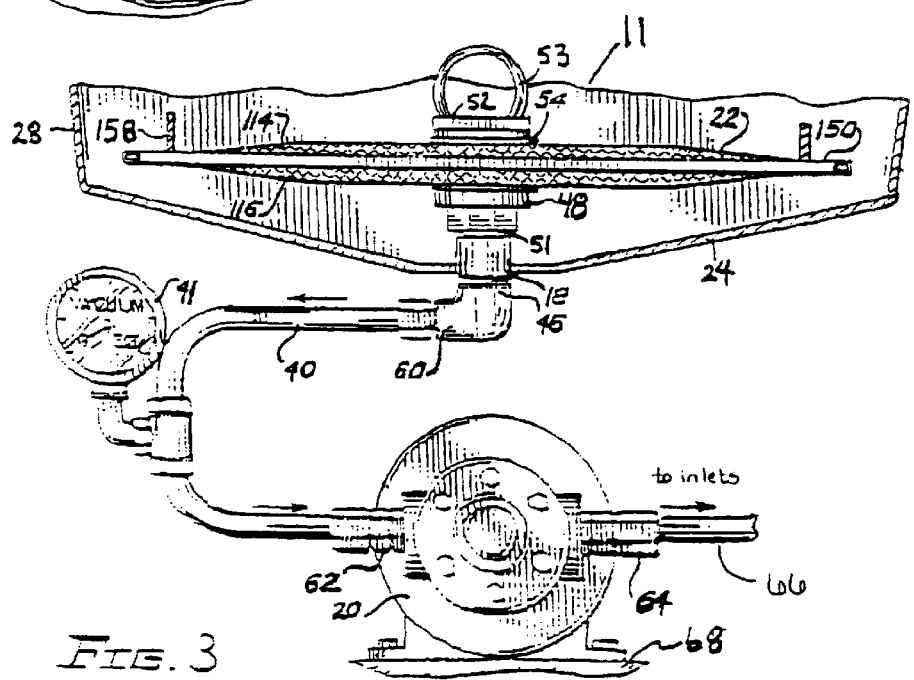

WALLED FRYER ELEMENT

CROSS-REFERENCE TO RELATED APPLICATIONS

This application claims the benefit of provisional patent application No. 60/391,113 entitled, "Walled Fryer Element," filed on Jun. 21, 2002 in the United States Patent and Trademark Office.

STATEMENT REGARDING FEDERALLY SPONSORED RESEARCH OR DEVELOPMENT

Not Applicable.

BACKGROUND OF THE INVENTION

1. Field of the Invention

The present invention relates generally to frying apparatuses used for deep-fat frying. More particularly, the present invention relates to a filter configuration for filtering cooking oil used in a deep-fat fryer.

2. Description of the Related Art

Cooking oil is extensively used in the food industry to cook various comestibles. Animal fat or other suitable material may sometimes be used as the cooking material in lieu of cooking oil. The term "cooking oil" is used herein to designate any such material.

Frying is frequently accomplished in relatively deep containers with the comestible to be cooked immersed in the cooking oil. In cases where quantities of food are regularly cooked in such a manner, the cooking oil becomes contaminated with various particles of food or other impurities, and charred food particles produce an odor, which adversely affects the taste of foods cooked therein.

Existing commercially available systems and apparatus for filtering cooking oil require that the cooking operation be interrupted to filter the cooking oil or to clean the continuous filtering systems. This results in significant downtime. Even with continuous filtering systems there is periodic delay for cleaning of the filters, which require the cooking oil to be cooled or drained.

U.S. Pat. No. Re. 34,636, reissued on Jun. 14, 1994, to the present inventor, describes a cooking oil filtering apparatus, which can be used to effectively remove particulates from the cooking oil. The cooking oil is drawn through wire mesh screens by applying suction into the wire mesh screens. As the cooking oil is drawn to the wire mesh screens, the screen serves to remove particulates from the cooking oil. The particulate-free cooking oil is then drawn into an outlet and drawn through the tank to a pumping apparatus. The pumping apparatus will then pass the cooking oil outwardly so that it flows back into the container or other destination. This process is carried on until particulate matter is removed from the cooking oil. A filter powder may be dispersed in the cooking oil to accumulate on the outer surfaces of the wire mesh screens.

U.S. Pat. No. 5,404,799, issued on Apr. 11, 1995, and U.S. Pat. No. 5,486,370, issued on Jan. 23, 1996, both to the present inventor, describe a cooking oil filtering apparatus and method, which can be used to effectively remove particulates from the cooking oil. Though relatively infrequent, the described apparatus and method require periodic shut-down for cleaning operations.

It would be an improvement to the field to have a filter configuration that extended the period between shut-downs for cleaning operations by increasing a filter's capacity to accumulate cooking debris from the cooking oil.

BRIEF SUMMARY OF THE INVENTION

The present invention is a filter for a fryer system of the type that includes a filter disposed in the fryer container, an outlet port connected to the filter, a container inlet and pump means for circulating cooking oil through the filter, the outlet port and back into the container through the container inlet. The filter serves to accumulate free particles from the cooking oil during the cooking operation. The filter includes edge members around the perimeter of the filter. Wall elements protrude outward from the edge members, adjacent to the perimeter of the upper filtering surface. Such configuration allows the filter to accommodate a greater quantity of debris on the filter before needing to be cleaned.

Accordingly, the objects of my invention is to provide, inter alia, a filter apparatus that:

provides increased capacity to retain cooking debris; and provides for longer intervals between cleanings.

Other objects of my invention will become evident throughout the reading of this application.

BRIEF DESCRIPTION OF THE DRAWINGS

FIG. 2 is a partially cutaway isometric view of a continuous-filtering fryer employing an embodiment of the present invention.

FIG. 3 is a partial cross-sectional side view of the fryer of FIG. 2 taken across line 3—3.

DESCRIPTION OF THE INVENTION

Figure 1:
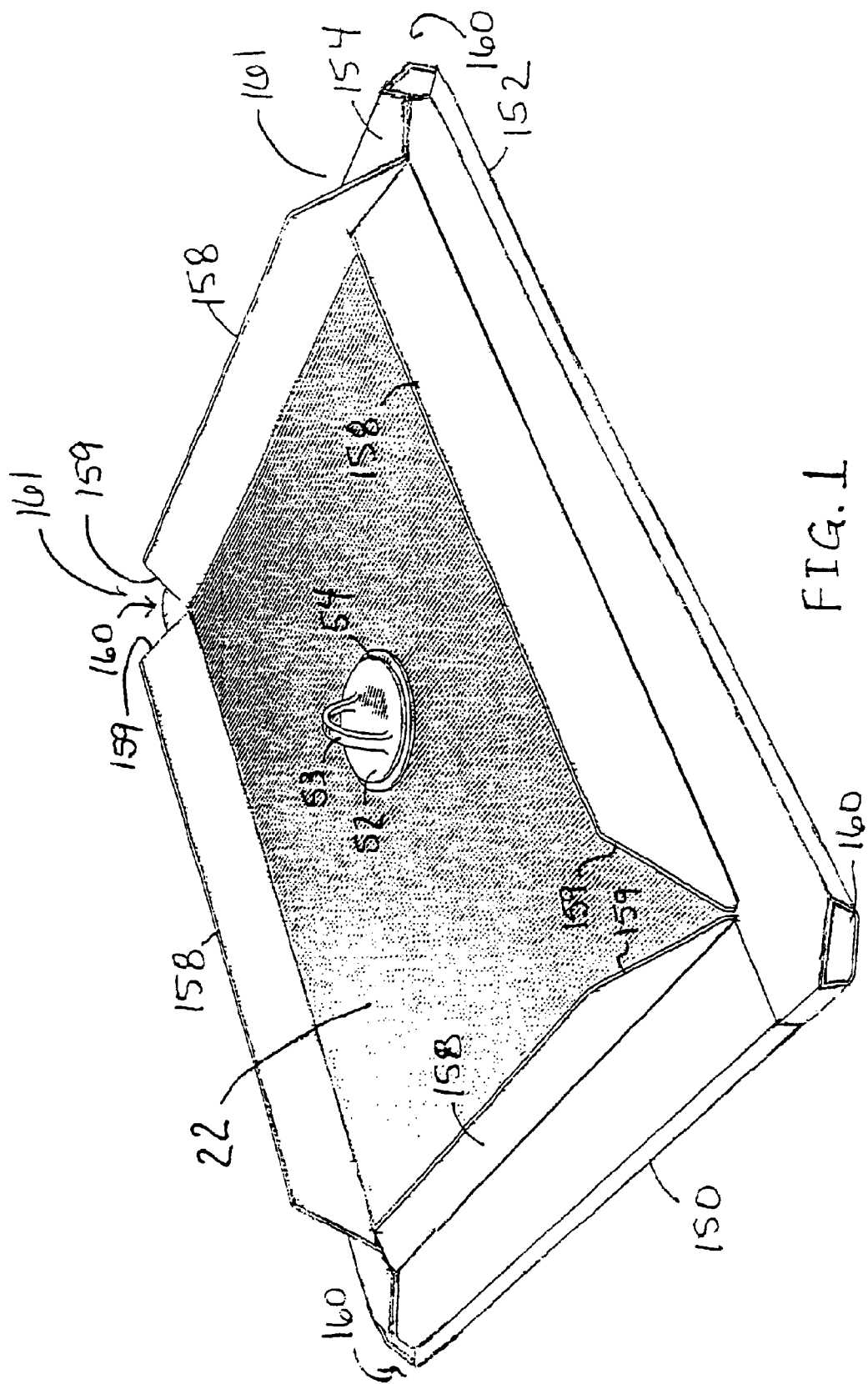
FIG. 1 is a perspective view of a walled filter of the current invention.

Referring to FIGS. 2 and 3, there is shown at 10 a continuous-filtering fryer apparatus for use with the exemplary embodiment of the filter assembly 11 of the present invention. The exemplary continuous-filtering fryer apparatus 10 comprises tank 12, inlet ports 14 and 16, outlet port 18, pump 20 and filter assembly 11. Each of these elements are arranged so as to provide the necessary filtering of the cooking oil (not shown) contained within the fryer apparatus 10.

Tank 12 includes a bottom 24 and side walls 26, 28, 30, and 32. The walls are arranged so as to define tank 12 for the containing of cooking oil therein. Suitable heating elements 33 are provided above screen 35 within the tank 12, so as to bring the cooking oil to a proper temperature. Heating elements 33 extend across the interior of tank 12. Segments of heating elements 33 are shown in FIG. 2.

Referring to FIGS. 2 and 3, inlet ports 14 and 16 are affixed to side walls 32 and 28, respectively. Typically, the inlet ports 14 and 16 will be positioned below the level of the cooking oil within tank 12. The outlet port 18 is affixed to the tank 12, so as to be in communication with an interior of tank 12 adjacent the bottom 24 of tank 12. Outlet port 18 includes an interior passageway, which allows for the movement of cooking oil therethrough. The cooking oil is drawn through line 40 into pump 20. After the cooking oil has entered pump 20, pump 20 pumps the cooking oil through line 66 to return lines 38 and 36 to inlet ports 14 and 16, respectively.

Referring to FIGS. 2, 3, 4 and 5, lower cap 48 has internally threaded passageway 100. One end of slip fitting 51 is threadedly connected internally to one end of lower cap 48. The other end of slip fitting 51 slidably seats into slip fitting receiver 19. Lower cap 48 extends upwardly and includes a generally flat top lip 50. Top lip 50 supports the filter 22 in a generally parallel relationship to bottom surface 24 of tank 12.

Upper cap 52 includes grasping loop 53, bolt head 54, and externally threaded upper cap body 104. Upper cap 52 is threadedly connected internally of lower cap 48. Filter 22 is sandwiched between upper cap 52 and lower cap 48. In exemplary filter assembly 11, filter 22 is comprised of multiple layers of washers, filter material and flow directing materials as well as upper mesh screen 114 and lower mesh screen 116. Upper cap body 104 has a plurality of radial ports 110, which extend through the interior of upper cap 52 into interior passageway 108, so as to allow for suction forces interior of filter 22, between the outside filter layers of upper mesh screen 114 and a lower mesh screen 116.

Upper cap 52 is threadedly fastened to lower cap 48, so as to allow for simple removal and disassembly of filter 22, as needed. Exemplary filter 22 is a generally flat member, which extends proximate to bottom surface 24 within tank 12. Filter 22 is maintained between the bottom 24 and side walls 26, 28, 30, and 32. In use, the cooking oil will flow around all of the sides of filter 22.

Figure 4:
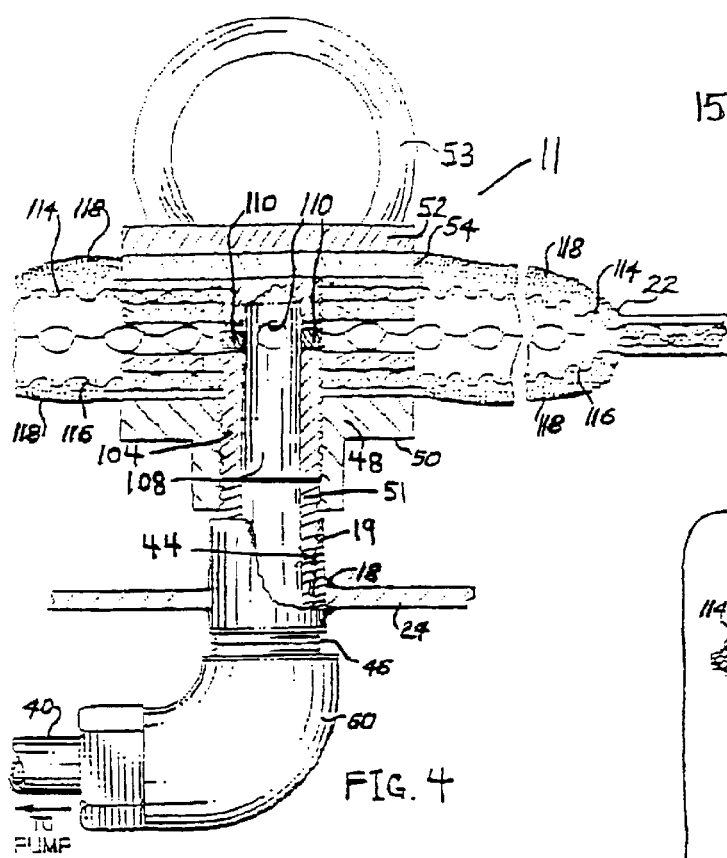
FIG. 4 is a detailed cross-sectional and partially cutaway view of a horizontal filter assembly of the fryer of FIG. 2.

Referring to FIGS. 2, 3 and 4, outlet port 18 includes an interior passageway, which allows for the movement of cooking oil therethrough. When pump 20 is activated, a suction force is created through line 40 and into filter 22. In effect, this causes cooking oil contained within the interior of tank 12 to flow through filter 22. Mesh screens 114 and 116 will cause the particulates within the cooking oil to accumulate on the surfaces. The filtered cooking oil is then free to flow through line 40 to pump 20.

Figure 5:
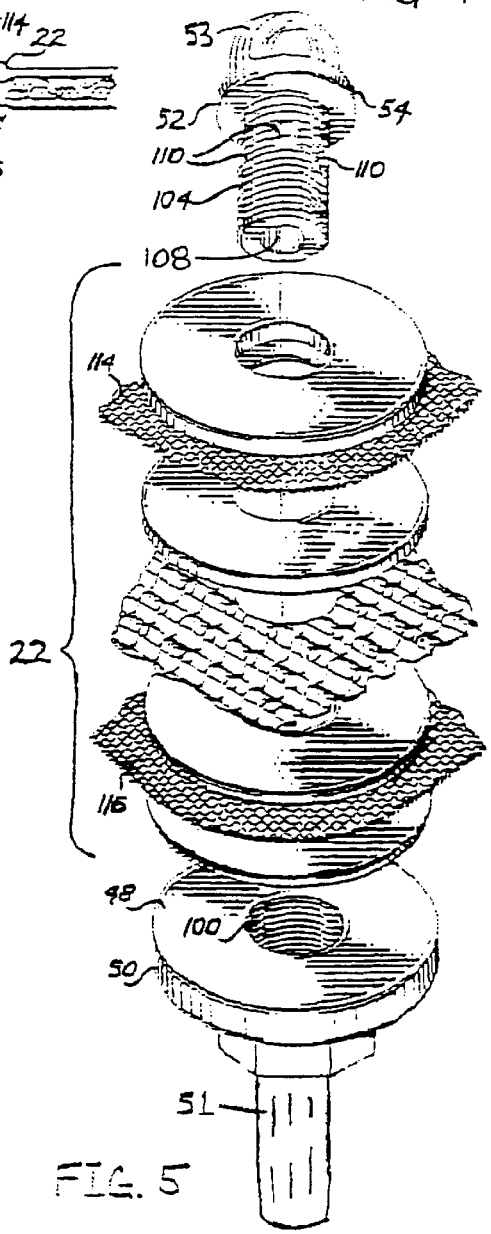
FIG. 5 is an exploded view of the horizontal filter assembly of FIG. 1.
Figure 6:
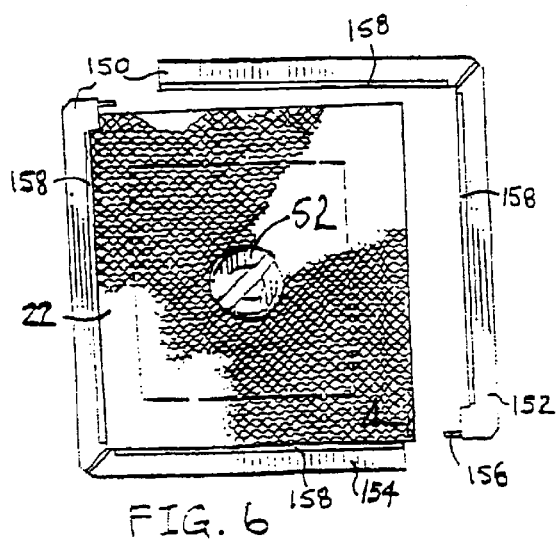
FIG. 6 is a top plan view of a horizontal embodiment of the inventive filter of FIG. 1.

FIGS. 1, 5 and 6 show an exemplary filter assembly 11 of the present invention. Filter assembly 11 is comprised of filter 22, upper cap 52, lower cap 48 and channeled members 150. Filter assembly 11 is shaped to compliment the shape of tank 12. Channeled members 150 surround the outer edges of filter assembly 11. The channeled members 150 securely engage filter 22. Channeled members 150 interlock, to form a rigid exterior frame for filter 22.

In the exemplary embodiment, channeled members 150 consist of two L-shaped channeled members 152 and 154, each of which maintains two edges of filter 22 in a contiguous configuration along the length of the respective edges. Alignment pins 156 are located on one end of each L-shaped channeled member 152 and 154.

Figure 7:
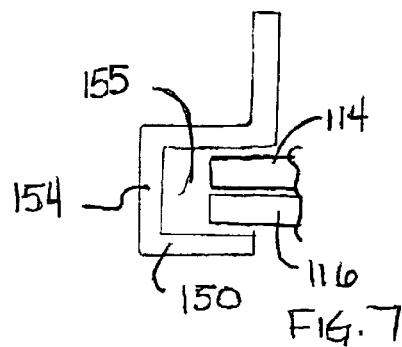
FIG. 7 is a partial cross-sectional side view of the inventive filter of FIG. 6 taken across line 7—7.

Referring to FIG. 7, an alignment pin receiving opening 155 located channeled member 154 is depicted. A like alignment pin receiving opening 155 is provided in channeled member 152. Each alignment pin 156 is received in a corresponding alignment pin receiving opening 155 of the adjacent channeled member 152 or 154.

Upper mesh screen 114 and lower mesh screen 116 form the exterior top and bottom filter surfaces of filter 22, interior the border formed by channeled members 150. Mesh screens 114 and 116 are positioned adjacent each other at their outer edges in the channels of each channeled member 150 and are held in such position by the tight fit of the two mesh screens 114 and 116 within the channels.

Filter wall 158 protrudes outward from channeled members 150, adjacent to upper mesh screen 114 and substantially perpendicular to upper mesh screen 114. When the mesh screen is horizontally positioned, the filter wall 158 extends upwardly from the mesh screen 114.

In the exemplary embodiment of filter wall 158, the filter wall 158 comprises a continuous surface with corner passageways 160 at each corner of the filter 22 at the base of the filter wall 158. In the preferred embodiment, corner passageways 160 comprise openings in channeled members 150. Corner passageways 160 permit cooking oil to drain from filter assembly 11 when filter assembly 11 is removed from tank 12 for cleaning.

Referring to FIG. 1, filter walls 158 have truncated ends 159 at each corner of filter 22, such truncated ends 159 together forming a drain opening 161 in filter walls 158 at each corner of filter 22. Drain openings 161 are wider at the top of filter walls 158 than at the lower portion of filter walls 158. The structure of drain openings 161 allow for rapid draining of cooking oil from above filter 22.

Preferably both corner passageways 160 and drain openings 161 are utilized. Corner passageways 160 and drain openings 161 also may be practiced independently of each other. When practiced together corner passageways 160 and drain openings 161 allow relatively quick draining of liquids form filter 22 and the area enclosed by filter walls 158 without loss of significant amounts of particulates 118.

In an alternative embodiment, not shown, filter wall 158 may be constructed with passageways at the base of filter wall 158 provided that the passageways therein are limited in size to prevent substantial amounts of particulate matter from washing off of the upper surface of screen 114 when the filter 22 is raised.

In operation, upon activation of pump 20, the cooking oil is drawn by suction applied by pump 20 through filter assembly 11, into the interior passageway of outlet port 18, and through line 40 to pump 20. As the pump 20 is operated, cooking oil (not shown) is circulated from tank 12, through filter assembly 11 and line 40 and is pumped back into tank 12 at inlet ports 14 and 16. Particulates 118, including coatings of food being fried, seasonings and the like, will accumulate on the outer surfaces of mesh screen 114 and 116. With the filter 22 horizontally oriented, the majority of the accumulation of particulates 118 will be on mesh screen 114 as such screen provides a support for the particulates 118. In routine operation, pump 20 is cycled from time to time between on and off. A suction force is not applied when pump 20 is off. Filter walls 158 allow a relatively large accumulation of particulates 118 to be accumulated and provide a retaining enclosure for the particulates when the filter assembly 11 is removed from the cooking oil. The filter walls 158 retain such particulates in a defined area when pump 20 is not operating.

Referring to FIGS. 1 and 4, upper cap 52 includes head 54 and a grasping loop 53. Grasping loop 53 is beneficial to extract filter assembly 11 while the cooking oil is hot. Corner passageways 160 permit cooking oil to drain from filter assembly 11 when filter assembly 11 is removed from tank 12 for cleaning.

In an alternative embodiment of the present invention, not shown, filter assembly 11 may be constructed as a single-sided filter 22. In such embodiment, a lower mesh screen 116 is not provided and the mesh screen 114 is the only filtering screen.

The filter assembly 11 described is used in continuous filtering operations. The filter assembly 11 is further advantageously used for filtering independent of frying operations. In such an operation, the filter assembly 11 is contained in a container which may be, but need not be, the tank 12 wherein frying is conducted. Cooking oil is circulated through the filter assembly 11 and returned to the container until the cooking oil is effectively filtered. The filtered cooking oil may thereafter be returned to use for frying operations. Upon completion of such filtering, the filter walls 158 retain particulates for disposal.

The foregoing disclosure and description of the invention is illustrative and explanatory thereof. Various changes in the details of the illustrated construction may be made within the scope of the appended claims without departing from the spirit of the invention. The present invention should only be limited by the following claims and their legal equivalents.

I claim:

1. A filter assembly for a filtering fryer system having a tank for containing hot oil, said filter assembly comprising:
    at least one filter having an upper filter screen;
    a filter wall extending around said upper filter screen;
    said filter wall defining an enclosed area above said upper filter screen;
    at least one drainage passageway proximate a lower edge of said filter wall;
    said upper filter screen having a screen outer edge;
    a plurality of channeled members;
    each of said plurality of channeled members interlocking at least a portion of said screen outer edge; and
    said filter wall extending upwardly from said plurality of channeled members.

2. The filter assembly of claim 1, wherein said at least one drainage passageway is located in at least one of said plurality of channeled members.

3. The filter assembly of claim 2, further comprising:
    each of said plurality of channeled members having a first connection end and a second connection end;
    an alignment pin located on each said first connection end; and
    each said alignment pin aligning each said first connection end with a second connection end of an adjacent channeled member.

4. The filter assembly of claim 2 wherein:
    said filter having a plurality of filter corner; and
    a drainage passageway located proximate each said filter corner.

5. The filter assembly of claim 1 wherein:
    at least one drain opening provided in said filter wall;
    said at least one drain opening having an tipper opening width and a lower opening width; and
    said upper opening width greater than said lower opening width.

6. The filter assembly of claim 5, wherein:
    said at least one filter having a plurality of filter corners; and
    a drain opening provided at cach said filter corner.

7. The filter assembly of claim 1 wherein said at least one filter comprises an upper filter screen and a lower filter screen.

8. A filter assembly for a filtering system having a tank for containing hot oil, said filter assembly comprising:
    at least one filter having an upper filter screen and a lower filter screen;
    said upper filter screen having a plurality of upper filter screw edges;
    said lower filter screen having a plurality of lower filter scum edges;
    a plurality of channeled members;
    each of said plurality of channeled members retaining an upper filter screen edge and a lower filter screen edge within a channel;
    a filter wall attending upwardly from each said plurality of channeled members;
    said filter wall defining an enclosed area above said upper filter screen, and
    at least one drainage aperture.

9. The filter assembly of claim 8 further comprising:
    said at least one drainage aperture is at least one drainage passageway; and
    said at least one drainage passageway provided in at least one of said plurality of channeled members.

10. The filter assembly of claim 9, further comprising:
    said plurality of channeled members each having a first connection end and a second connection end;
    an alignment pin located on each said first connection end; and
    said alignment pin aligning said first connection end with a second connection end of an adjacent channeled member.

11. The filter assembly of claim 9 wherein a plurality of drainage passageways provided in said plurality of channeled members.

12. The filter assembly of claim 11, further comprising:
    said plurality of channeled members each having a first connection end and a second connection end;
    an alignment pin located on each said first connection end;
    an opening located within each said second connection end; and
    each said alignment pin aligning each said first connection end with said opening of a second connection end.

13. The filter assembly of claim 12, wherein said at least one filter having a plurality of filter corners; and a drainage passageway located at each said plurality of filter corners.

14. The filter assembly of claim 8 wherein:

at least one drainage opening is provided in said filter wall;

said at least one drainage opening having an upper opening width and a lower opening width; and said upper opening width greater than said lower opening width.

15. The filter assembly of claim 8 wherein:

said at least one drainage aperture is provided in said filter wall proximate a lower edge of said filter wall.

16. The filter assembly of claim 15, wherein:

said at least one filter having a plurality of filter corners; and at least one drainage aperture located at each said filter corner.

17. A filter assembly for a filtering fryer system having a tank for containing hot oil, said filter assembly comprising:

a filter having an upper filter screen and a lower filter screen;

a plurality of channeled members;

each of said plurality of channeled members interlocking at least a portion of said upper filter screen and said lower filter screen;

a filter wall extending upwardly from said plurality of channeled members;

said filter wall defining an enclosed area above said upper filter screen;

at least one drain opening provided in said filter wall;

said at least one drain opening having an upper opening width and a lower opening width;

said upper opening width greater than said lower opening width.

18. The filter assembly of claim 17 wherein:

said at least one filter having a plurality of filter corners; and a drain Opening provided at each said filter corner.

19. The filter assembly of claim 17, wherein:

at least one drainage passageway in at least one said channeled members.

20. The filter assembly of claim 18, further comprising:

a drainage passageway provided at each said filter corner.

* * * * *